(12) United States Patent
Miyaji et al.

(10) Patent No.: US 9,024,867 B2
(45) Date of Patent: May 5, 2015

(54) CHARACTER INPUT DEVICE

(75) Inventors: Noriyuki Miyaji, Tokyo (JP); Kyoko Yamazaki, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 488 days.

(21) Appl. No.: 13/356,753

(22) Filed: Jan. 24, 2012

(65) Prior Publication Data

US 2012/0218178 A1   Aug. 30, 2012

(30) Foreign Application Priority Data

Jan. 26, 2011   (JP) ................. 2011-014486

(51) Int. Cl.
G09G 5/00   (2006.01)
G06F 3/023   (2006.01)

(52) U.S. Cl.
CPC ............ *G06F 3/0236* (2013.01); *G06F 3/0234* (2013.01)

(58) Field of Classification Search
CPC .............................. G06F 3/0236; G06F 3/0234
USPC .................................................. 345/156–158
See application file for complete search history.

(56) References Cited

U.S. PATENT DOCUMENTS

| 7,530,031 | B2 | 5/2009 | Iwamura et al. | |
| 7,724,156 | B2 * | 5/2010 | Park et al. | 341/22 |
| 7,924,264 | B2 * | 4/2011 | Ohta | 345/157 |
| 8,133,115 | B2 * | 3/2012 | Campbell | 463/31 |
| 8,462,119 | B2 * | 6/2013 | Griffin et al. | 345/169 |
| 8,512,136 | B2 * | 8/2013 | Takehiro | 463/29 |
| 2001/0040517 | A1 * | 11/2001 | Kisaichi et al. | 341/22 |
| 2001/0045937 | A1 * | 11/2001 | Hagiwara et al. | 345/156 |
| 2001/0048378 | A1 * | 12/2001 | Horie | 341/22 |
| 2002/0060699 | A1 * | 5/2002 | D'Agostini | 345/783 |
| 2002/0063687 | A1 * | 5/2002 | Kim | 345/160 |
| 2002/0145587 | A1 * | 10/2002 | Watanabe | 345/156 |
| 2003/0001821 | A1 * | 1/2003 | Shepherd et al. | 345/168 |
| 2003/0017873 | A1 | 1/2003 | Ohara et al. | |
| 2003/0179185 | A1 * | 9/2003 | Iwamura et al. | 345/168 |

(Continued)

FOREIGN PATENT DOCUMENTS

EP  1731992   12/2006
JP  07-200123  8/1995

(Continued)

OTHER PUBLICATIONS

Search report from E.P.O., mail date is May 28, 2013.

(Continued)

*Primary Examiner* — Quan-Zhen Wang
*Assistant Examiner* — Chun-Nan Lin
(74) *Attorney, Agent, or Firm* — Greenblum & Bernstein, P.L.C.

(57) ABSTRACT

A character input device displays character input information on a display screen with a small area and allows a user to input a desired character by a simple operation even when it is necessary to select the desired character from plural characters to input the desired characters. In a character selection area, a circle is added to a character "NA" and characters in the "NA" series are selected. A ▼ mark is added to an upper part of the circle added to the character of "NA" and a Δ mark is added to a lower part of the circle. By pressing one of an upward and a downward directions of a cross key, the characters can be selected. If the upward direction of the cross key is pressed, the character "NI" is selected and displayed, instead of the character "NA".

4 Claims, 8 Drawing Sheets

| | FIRST CHARACTER GROUP (A) | FIRST CHARACTER GROUP (B) | FIRST CHARACTER GROUP (C) |
|---|---|---|---|
| HIRAGANA | A I U E O<br>TA CHI TSU TE TO ⇔ KA KI KU KE KO<br>SA SHI SU SE SO | NA NI NU NE NO<br>YA YU YO ⇔ HA HI FU HE HO<br>MA MI MU ME MO | RA RI RU RE RO<br>LINE FEED ⇔ WA WO NN<br>SPACE |
| KATAKANA | A I U E O<br>TA CHI TSU TE TO ⇔ KA KI KU KE KO<br>SA SHI SU SE SO | NA NI NU NE NO<br>YA YU YO ⇔ HA HI FU HE HO<br>MA MI MU ME MO | RA RI RU RE RO<br>LINE FEED ⇔ WA WO NN<br>SPACE |
| ENGLISH CHARACTER | A B C<br>J K L ⇔ D E F<br>G H I | M N O<br>W X Y Z ⇔ P Q R S<br>T U V | NONE |
| NUMERAL/ SIGN | 1 2 3 4 5 6 7 8 9 0<br>FREQUENCY ⇔ CALCULATION SIGN<br>ALL SIGNS | NONE | NONE |
| FACE FONTS | (^_^) EMOTION<br>≡☆ ETC ⇔ (=^ω^)/ CONVERSATION<br>ヽ(´д`)ﾉ=3 BEHAVIOR | NONE | NONE |

(56) References Cited

U.S. PATENT DOCUMENTS

| | | | |
|---|---|---|---|
| 2006/0294273 A1* | 12/2006 | Lee | 710/67 |
| 2008/0016457 A1* | 1/2008 | Tabuchi et al. | 715/773 |
| 2008/0268956 A1* | 10/2008 | Suzuki | 463/37 |
| 2009/0176532 A1* | 7/2009 | Chae et al. | 455/566 |
| 2010/0160040 A1* | 6/2010 | Ikeda | 463/31 |
| 2010/0283736 A1* | 11/2010 | Akabane et al. | 345/168 |
| 2011/0012831 A1 | 1/2011 | Lin | |
| 2012/0110479 A1* | 5/2012 | Fujisawa et al. | 715/758 |

FOREIGN PATENT DOCUMENTS

| | | | |
|---|---|---|---|
| JP | 09-073353 | 3/1997 | |
| JP | 2000-155643 | 6/2000 | |
| JP | 2001-265501 | 9/2001 | |
| JP | 2001265501 A * | 9/2001 | G06F 3/023 |
| JP | 2002-268803 | 9/2002 | |
| JP | 2002-325965 | 11/2002 | |
| JP | 2003-196005 | 7/2003 | |
| JP | 2003-209607 | 7/2003 | |
| JP | 2003-216312 | 7/2003 | |
| JP | 2007-193648 | 8/2007 | |
| WO | 03/090008 | 10/2003 | |

OTHER PUBLICATIONS

Japan Office action, dated May 28, 2013 along with an english translation thereof.

Japan Office action, dated Feb. 12, 2013 along with an english translation thereof.

Japan Office action, dated Aug. 12, 2014 along with an English translation thereof.

* cited by examiner

FIG. 3

| CHARACTER TYPE | FIRST CHARACTER GROUP | OPERATION BUTTON | SECOND CHARACTER GROUP | | | | |
|---|---|---|---|---|---|---|---|
| | | | SELECTION PRIORITY, FIRST | SELECTION PRIORITY, SECOND | SELECTION PRIORITY, THIRD | SELECTION PRIORITY, FOURTH | SELECTION PRIORITY, FIFTH |
| HIRAGANA | FIRST CHARACTER GROUP (A) | UPPER | A | I | U | E | O |
| | | RIGHT | KA | KI | KU | KE | KO |
| | | LOWER | SA | SHI | SU | SE | SO |
| | | LEFT | TA | CHI | TSU | TE | TO |
| | | ........ | ........ | ........ | ........ | ........ | ........ |
| HIRAGANA | FIRST CHARACTER GROUP (B) | | | | | | |

41 — CHARACTER TYPE
42 — FIRST CHARACTER GROUP
43 — OPERATION BUTTON
44 — SECOND CHARACTER GROUP
44a — SELECTION PRIORITY, FIRST
44b — SELECTION PRIORITY, SECOND
44c — SELECTION PRIORITY, THIRD
44d — SELECTION PRIORITY, FOURTH
44e — SELECTION PRIORITY, FIFTH
40

FIG. 4

| | FIRST CHARACTER GROUP (A) | FIRST CHARACTER GROUP (B) | FIRST CHARACTER GROUP (C) |
|---|---|---|---|
| HIRAGANA | A I U E O<br>TA CHI TSU TE TO ↔ KA KI KU KE KO<br>SA SHI SU SE SO | NA NI NU NE NO<br>YA YU YO ↔ HA HI FU HE HO<br>MA MI MU ME MO | RA RI RU RE RO<br>LINE FEED ↔ WA WO NN<br>SPACE |
| KATAKANA | A I U E O<br>TA CHI TSU TE TO ↔ KA KI KU KE KO<br>SA SHI SU SE SO | NA NI NU NE NO<br>YA YU YO ↔ HA HI FU HE HO<br>MA MI MU ME MO | RA RI RU RE RO<br>LINE FEED ↔ WA WO NN<br>SPACE |
| ENGLISH CHARACTER | A B C<br>JKL ↔ DEF<br>GHI | M N O<br>WXYZ ↔ PQRS<br>TUV | NONE |
| NUMERAL/ SIGN | 1 2 3 4 5 6 7 8 9 0<br>FREQUENCY ↔ CALCULATION SIGN<br>ALL SIGNS | NONE | NONE |
| FACE FONTS | (^-^) EMOTION<br>≡☆ ETC ↔ (=ʻωʻ)ﾉ CONVERSATION<br>ヽ(´Д`)ノ=3 BEHAVIOR | NONE | NONE |

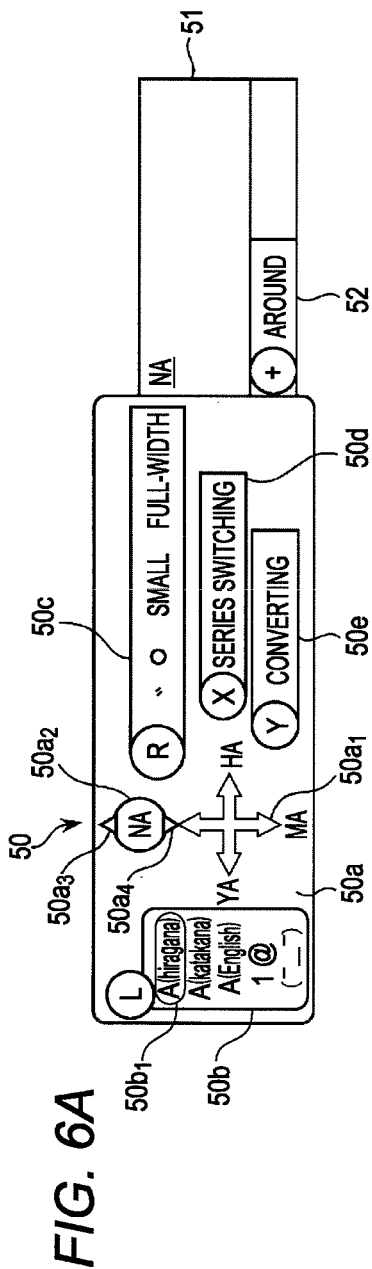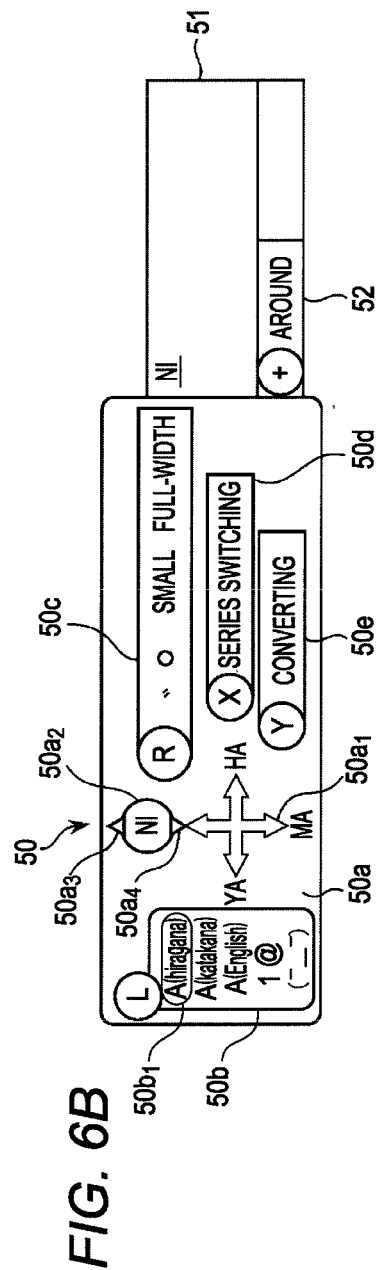
FIG. 6A
FIG. 6B

CHARACTER INPUT DEVICE

CROSS REFERENCE TO RELATED APPLICATION

The present disclosure relates to subject matter contained in Japanese Patent Application No. 2011-014486 field on Jan. 26, 2011, the disclosure of which is expressly incorporated herein by reference in its entirety.

BACKGROUND OF THE INVENTION

1. Field of the Invention

The present invention relates to a character input device and a character input program that can display character input information with a relatively small area in a display screen without hindering a user from viewing other information.

2. Description of the Related Art

In the related art, in an online game such as an MMORPG, a player can implement a game by matching against an enemy character or moving on a field while chatting with other players. When the player chats in the online game, characters are input by connecting a keyboard to a game apparatus or by using a software keyboard where a keyboard is displayed on a display screen and characters are input by operating buttons. However, when there are a large number of object characters to be input, a software keyboard 53 displayed on a display screen 24 needs to be large, as illustrated in FIG. 8, in order to prevent occurrence of a situation where a button to select each character is displayed in a small size and thus it becomes difficult for a user to discriminate the button. As a result, the software keyboard 53 is displayed to overlap a game character 60 such as a player character or a non-player character and it becomes difficult for the user to view a game implementation situation such as an operation of each game character or various kinds of information such as a parameter regarding the game implementation situation.

For example, Japanese Patent Application Laid-Open (JP-A) No. 1997-73353 discloses a technique for reducing an area of the software keyboard displayed on the screen and enabling the entire screen to be easily viewed by a user even when the screen is small so that the technique can be employed in a portable information terminal or the like having a relatively small display screen. According to the technique, a software keyboard for displaying Japanese syllabary (50 sillabary) is displayed in only one sound line such as "A" series or "I" series.

However, according to the technique disclosed in JP-A No. 1997-73353, it is difficult to reduce the area of the software keyboard displayed within the display screen up to the desired size. Furthermore, when there are a lot of character types such as hiragana, katakana, English character, and numeral/sign, it is bothersome for the user to select a desired character.

SUMMARY OF THE INVENTION

The present invention provides a character input device that can display character input information on a display screen with a small area and allows a user to input a desired character by a simple operation even in a case where it is necessary to select the desired character from plural characters to input the desired characters.

According to a first aspect of the present invention, there is provided a character input device that comprises a display part and an input part and inputs a character according to an operation of the input part by a user, wherein the input characters belong to any one of a plurality of first character groups, the character input device comprising: a first character group selector that selects a first character group which the input characters belong to, from the plurality of first character groups, according to the operation of the input part by the user; a first character group information displayer that displays first character group information about the first character group selected by the first character group selector in the display part; a character selector that selects the input character from the first character group selected by the first character group selector, according to the operation of the input part by the user; and an input character determiner that determines the character selected by the character selector as the input character, according to the operation of the input part by the user.

For example, when hiragana is input object characters, it is assumed that: characters of "A" series, "KA" series, "SA" series, and "TA" series belong to a first character group (A); characters of "NA" series, "HA" series, "MA" series, and "YA" series belong to a first character group (B); and characters of "RA" series and "WA" belong to a first character group (C). On that assumption, the first character group (A) is selected when a user desires to input a character out of the characters of "A" series to "TA" series, the first character group (B) is selected when the user desires to input a character out of the characters of "NA" series to "YA" series, and the first character group (C) is selected when the user desires to input a character out of the characters of "RA" series to "WA" series. If the user selects any one first character group out of the first character groups (A) to (C), only information about the selected first character group is displayed on the display screen. The user selects one character to be input from the characters belonging to the selected first character group, while viewing the information about the displayed first character group.

Therefore, not all of the input object characters may be displayed on the display screen but information about part of the input object characters may be displayed on the display screen, and the user may select a character while switching between the first character groups which are displayed on the display screen, if necessary. For this reason, the character input information can be displayed on the display screen with a relatively small area without hindering the user from viewing other information.

Preferably, according to the first aspect of the present invention, the input characters belong to any one of a plurality of character type groups, each character type group comprises the plurality of first character groups, the character input device comprises a character type group selector that selects the character type group which the input characters belong to, according to the operation of the input part by the user, and the first character group selector selects the first character group which the input characters belong to, from the first character groups constituting the character type group selected by the character type group selector.

The user can select the character type group such as hiragana, katakana, English character, numeral, sign, and face font, as the type of the input object character (hereinafter, referred to as character type). In this case, hiragana, katakana, English character, and numeral and sign are classified into a character type group (A), a character type group (B), a character type group (C), and a character type group (D) respectively. Each character type group further includes at least one first character group. Accordingly, the user first selects any one character type group from the character type groups (A) to (D), and then selects the first character group to which the desired character to be input belongs, thereby being capable of inputting a character.

Therefore, even when the plural character types are the input object characters, not all of the input object characters are displayed on the display screen at a time but the information regarding part of the characters is displayed on the display screen so that the user can input a desired character. For this reason, the character input information can be displayed on the display screen within a relatively small area and the user may not have difficulty in viewing other information.

Preferably, according to the first aspect of the present invention, the input characters belong to any one of a plurality of second character groups, each first character group comprises the plurality of second character groups, the priorities are set to the characters that belong to the second character groups, the character selector selects the input characters from the characters belonging to the second character groups, according to the priorities, and the first character group information displayer displays the characters selected by the character selector, among the characters belonging to the second character groups.

For example, a case in which the input object characters are hiragana, and as the first character group, the first character group (A) is selected which the characters of "A" series to "TA" series belong to is described. In this case, the characters of "A" series belong to a second character group (A-1), the characters of "KA' series belong to a second character group (A-2), the characters of "SA" series belong to a second character group (A-3), and the characters of "TA" series belong to a second character group (A-4). For example, the five characters of "A", "I", "U", "E", and "O" belong to the second character group (A-1) which the characters of "A" series belong to, "A" is set to have the highest priority and "O" is set to have the lowest priority. Likewise, "KA" has the highest priority in "KA" series, "SA" has the highest priority in "SA" series, and "TA" has the highest priority in "TA" series.

When the first character group (A) is selected, first, "A", "KA", "SA", and "TA" that have the highest priority in "A" series to "TA" series, respectively are displayed on the display screen. When the user performs a key input to select the character of the second character group (A-1) from the first character group (A), "A" that has the highest priority is selected and the character "A" is enlarged and displayed. If the same key is input, the display of the character "A" is erased and the character "I" which is enlarged as compared with the normal case is displayed. Hereinafter, the characters "U", "E", and "O" are sequentially displayed according to the priority, whenever the same key is input. Finally, any one character out of the characters "A" to "O" is determined as the input character.

By this configuration, among the characters belonging to the selected second character group, only the character selected at that time is displayed. Accordingly, all of the characters that belong to the second character group need not be displayed on the display screen. Therefore, the character input information can be displayed within a relatively small area on the display screen without hindering the user from viewing other information.

Preferably, according to the first aspect of the present invention, the input characters belong to any one of the plurality of second character groups, each first character group comprises the plurality of second character groups, the input part comprises a direction input part configured to input a direction, and the character selector specifies the second character group which the input characters belong to, on the basis of the direction input to the direction input part, and selects the characters belonging to the specified second character group.

For example, when hiragana is the input object characters, the first character group (A) which the characters of "A" series to "TA" series belong to is selected as the first character group. In this case, the characters of "A" series belong to a second character group (A-1), the characters of "KA' series belong to a second character group (A-2), the characters of "SA" series belong to a second character group (A-3), and the characters of "TA" series belong to a second character group (A-4). When a direction input part is a cross key, the upward, downward, leftward, and rightward directions of the cross key correspond to the second character groups (A-1) to (A-4), respectively. Accordingly, the second character group can be selected by pressing the cross key once. That is, when the direction input part such as the cross key is not used, any one series out of "A" series, "KA" series, "SA" series, and "TA" series needs to be selected by continuously pressing the operation button plural times. By this configuration, an input of the characters of any one series out of "A" series to "TA" series can be selected by a simple operation such as one-time pressing of the cross key.

Preferably, according to the first aspect of the present invention, the priorities are set to the characters belonging to the second character groups, the character selector selects the input characters from the characters belonging to the second character group, according to the priorities, when the same direction as the direction which is initially input to the direction input part to specify the second character group which the input characters belong to is input to the direction input part.

And preferably, the character selector selects the input characters from the characters belonging to the second character group, according to the inverse priorities of the priorities, when a reverse direction, which is opposite to the direction which is initially input to the direction input part to specify the second character group which the input characters belong to, is input to the direction input part.

When the input characters are selected from the selected second character group, if the same direction of the cross key is input, the characters are selected according to the priorities of the second character groups. For example, when the user presses the upward direction of the cross key to select the characters of the second character group (A-1) from the first character group (A), "A" that has the highest priority is enlarged and displayed. If the upward direction is input, the character of "I" is displayed.

In this case, for example, the user may pass "U" and select "E", because the user erroneously excessively presses the cross key, in spite that the user originally intended to input the character "U". In the related art, the user needs to continuously input the same direction to return to initially displayed "A" and press the cross key several more times until "U" is displayed again. However, in this invention, the selected character can be returned from "E" to "U" by pressing the cross key in a reverse direction (in this case, downward direction). Therefore, the character input can be performed without giving an excessive load to the user.

According to a first aspect of the present invention, the input part comprises at least one operation input part that causes the character input device to execute a predetermined function according to an input from the user, and an input part displayer that displays information about the function of the operation input part in the display part to correspond to the arrangement of the operation input part in the input part.

Since the arrangement of the operation buttons of the input part (controller) and the information about the functions of when the operation buttons are pressed have a correspondence relationship and are displayed on the display screen, the user can input the characters while viewing the display screen, in operating the input part without difficulty.

According to a second aspect of the present invention, there is provided a tangible computer readable medium that stores a character input program that executes a character input in a computer device which comprises a display part and an input part, according to an operation of the input part by a user, wherein the input characters belong to any one of a plurality of first character groups, the character input program causing the computer to function as: a first character group selector that selects the first character group which the input characters belong to, from the plurality of first character groups, according to the operation of the input part by the user; a first character group information displayer that displays first character group information about the first character group selected by the first character group selector in the display part; a character selector that selects the input characters from the first character group selected by the first character group selector, according to the operation of the input part by the user; and an input character determiner that determines the characters selected by the character selector as the input characters, according to the operation of the input part by the user.

BRIEF DESCRIPTION OF THE DRAWINGS

FIG. 3 is a diagram illustrating a character input table set by the character input device according to the embodiment of the present invention;

FIG. 4 is a diagram illustrating a relationship of an operation of a cross key and a selected character for each character type;

FIGS. 6A and 6B are diagrams illustrating an example of a character input window in the character input device according to the embodiment of the present invention;

DETAILED DESCRIPTION OF THE EMBODIMENTS

Figure 1:
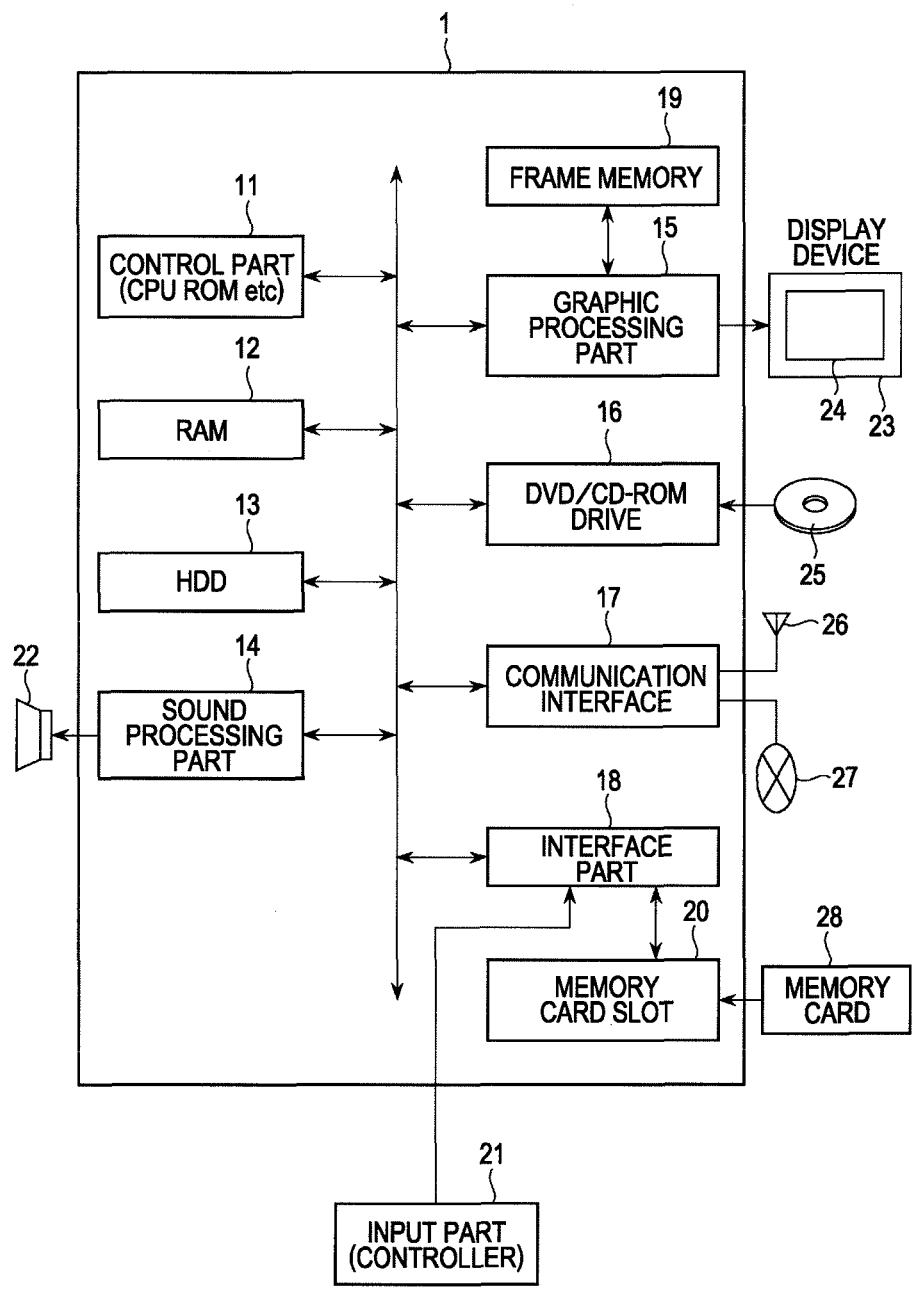
FIG. 1 is a block diagram illustrating the configuration of a character input device according to an embodiment of the present invention.

Hereinafter, an embodiment of the invention will be described with reference to the accompanying drawings. In this embodiment, the case where a character input device according to the invention is applied to a game apparatus will be described. FIG. 1 is a block diagram illustrating the configuration of a character input device (game apparatus) according to the embodiment of the present invention. The game apparatus comprises an apparatus body 1. The apparatus body 1 comprises a control part 11, a random access memory (RAM) 12, a hard disk drive (HDD) 13, a sound processing part 14, a graphic processing part 15, a DVD/CD-ROM drive 16, a communication interface 17, and an interface part 18 that are connected by an internal bus.

The control part 11 is configured using a central processing part (CPU) or a read only memory (ROM) and executes a program that is stored in the HDD 13 or a storage medium 25 and controls the apparatus body 1. The control part 11 comprises an internal timer. The RAM 12 is a work area of the control part 11. The HDD 13 is a storage area to store the program or data.

The DVD/CD-ROM drive 16 can mount the storage medium 25 such as a DVD-ROM or a CD-ROM in which a game program is stored. A program and data that are needed to play a game by a video game apparatus are stored in the storage medium 25, and the program and the data are read by the DVD/CD-ROM drive 16 and are loaded to the RAM 12.

The control part 11 reads data needed for an implementing game from the RAM 12 and executes a process. The needed data is loaded from the storage medium 25 to the RAM 12, according to a game implementation situation. The control part 11 processes the program and the data loaded to the RAM 12, outputs an instruction of a sound output to the sound processing part 14, and outputs a drawing command to the graphic processing part 15. The sound processing part 14 is connected to a sound output device 22 to be a speaker. If the control part 11 outputs the instruction of the sound output to the sound processing part 14, the sound processing part 14 outputs a sound signal to the sound output device 22.

The graphic processing part 15 is connected to a display device 23 having a display screen 24. If the drawing command is output from the control part 11, the graphic processing part 15 develops an image to a frame memory (frame buffer) 19 and outputs a video signal to display an image on the display screen 24 of the display device 23. One frame period of the image that is included in the video signal output from the graphic processing part 15 is, for example, 1/30 sec. The graphic processing part 15 executes drawing of one image in a unit of frame (that is, unit of 1/30 sec.).

To the interface part 18, an input part (controller) 21 and a memory card slot 20 are connected. The input part 21 includes direction keys and plural operation buttons and the characters are input by operating the direction keys and the operation buttons. Information that is input from the input part 21 by the player is stored in the RAM 12 and the control part 11 executes various operation processes on the basis of the input information.

The communication interface 17 is connected to the communication network 27 by wire or wireless. The communication interface 17 can perform wireless communication with another game apparatus through a communication unit having an antenna 26.

Figure 2:
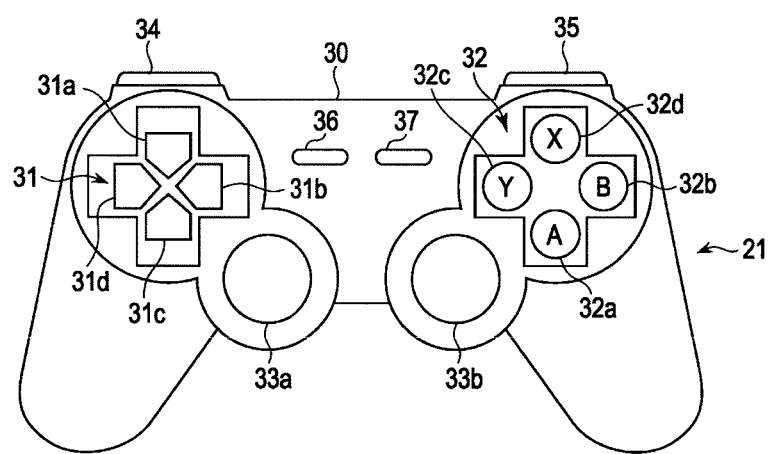
FIG. 2 is a diagram illustrating an input part of the character input device according to the embodiment of the present invention.

FIG. 2 is a diagram illustrating an example of the input part 21 according to of the present invention. A cross key 31 is provided at the left side of the front of an input part body 30 and a button group 32 is provided at the right side thereof. The cross key 31 includes an upward key 31a, a rightward key 31b, a downward key 31c, and a leftward key 31d and the button group 32 includes an A button 32a, a B button 32b, a Y button 32c, and an X button 32d. In a center part of the input part 21, a select button 36 or a start button 37 is provided. In a side part of the input part 21, plural buttons such as an L button 34 or an R button 35 are provided. At the lower right side of the cross key 31 and lower left side of the button group 32, joysticks 33a and 33b are provided. If the pressing force is applied to each button, a corresponding switch is turned on. A detection signal according to an on/off operation of the switch is generated in the input part 21. A detection signal that corresponds to an inclining azimuth of the joystick 33 is generated in the input part 21.

A detection signal of a switch system that is generated in the input part 21 is supplied to the interface part 18 and becomes detection information that indicates a button to be turned on. In the case of the joystick 33, the detection signal of the joystick system becomes detection information that indicates a state of the joystick 33. In this way, an operation instruction that is input from the input part 21 by the player is supplied to the apparatus body 1.

FIG. 3 is a diagram illustrating a character input table that is set by the character input device according to the embodiment of the present invention. A character input table 40 is set in the RAM 12 of the character input device and specifies a correspondence relationship of an operation with respect to the input part 21 and the input character, for a character group (first character group) of the case where the same character type is classified into plural groups. In the character input table 40, a character type 41, a first character group 42, an operation button 43, and a second character group 44 are previously stored.

The character type 41 indicates types of characters such as hiragana, katakana, English characters, numerals/signs, or face fonts. The first character group 42 indicates a group in which characters belonging to each character type are classified into at least one group. Among the characters that can be input, information about the first character group selected by the user is mainly displayed on the display screen. The operation button 43 indicates any one of upward, downward, leftward, and rightward directions of the cross key 31 of the input part 21. The second character groups 44 indicate groups in which the characters belonging to the first character group 42 are classified into plural groups and correspond to the operation button 43. In this case, the first character group 42 comprises the four second character groups 44 that correspond to the four directions of the cross key 31.

In the character input device according to the present invention, the second character group 44 that become a character input object is specified by pressing any direction of the cross key 31, according to the character input table 40. The plural characters are stored in each second character group 44 and the selection priorities of the characters that are selected as the input object characters are determined for each group. When the cross key 31 is operated by the user, the characters that have the low selection priorities or the high selection priorities are selected as the input object characters, according to a pressing direction of the cross key 31.

FIG. 4 is a diagram illustrating a relation of the operation of the cross key and the selected character for each character type. The character type is classified into five character types of hiragana, katakana, English character, numeral/sign, and face font and at least one first character group is provided in each character type. The first character group can be switched by the input operation from the user. The cross key 31 corresponds to the cross-shaped figure that has arrows at four cross front ends of FIG. 4 (hereinafter, referred to as cross-shaped figure) and characters that are described at the upper, lower, left, and right sides of the cross-shaped figure are characters that are selected when the cross key 31 is pressed in the corresponding directions. In the characters that are displayed in the individual directions of the cross-shaped figure, the selection priority of when the cross key 31 is pressed is determined and the character at the left side has the highest selection priority. For example, in the upward direction of the cross-shaped figure of the first character group (A) of hiragana, "A", "I", "U", "E", and "O" are displayed. However, "A" has the highest selection priority and "O" has the lowest selection priority. In the upward direction of the cross-shaped figure of the first character group (A) of English characters, "A", "B", and "C" are displayed. However, "A" has the highest selection priority and "C" has the lowest selection priority.

Figure 5:
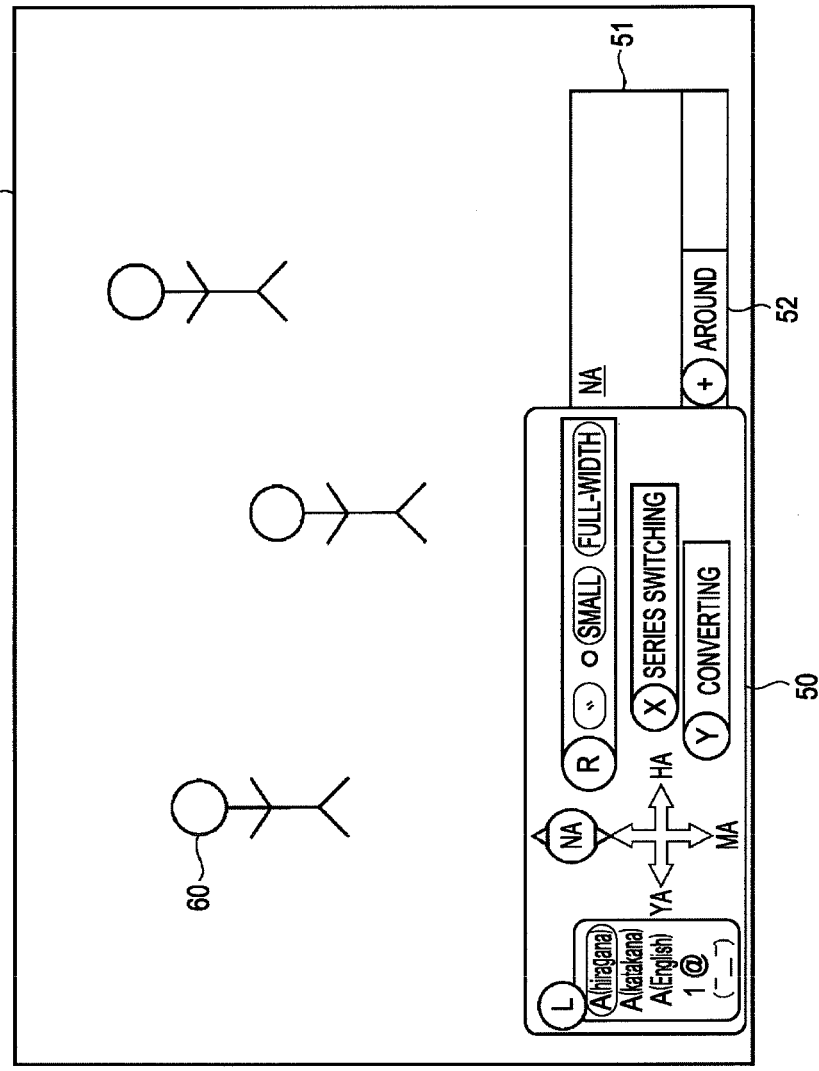
FIG. 5 is a diagram illustrating an example of a display screen in the character input device according to the embodiment of the present invention.

Next, a character input window that is displayed on the display screen 24 when the character input is performed will be described. FIG. 5 illustrates an example of the display screen 24 where the character input window is displayed, in the character input device according to the embodiment of the present invention. FIGS. 6A and 6B illustrate an example of the character input window in the character input device according to the embodiment of the present invention. As can be seen from FIG. 5, in the character input window 50, because only minimum information is displayed in inputting the characters, a display area with respect to the entire display screen 24 is small, the character input window 50 is not displayed to overlap a character 60, and confirmation of a game implementation situation by the user is not hindered.

In the character input window 50, a character selection area 50a where a cross-shaped figure $50a_1$ imitating the cross key 31 is displayed is disposed in a center part thereof, a character type selection area 50b is disposed at the left side of the center part, and operation function display areas 50c to 50e are disposed from the upper side of the right side of the center part. At the right side of the character input window 50, an input character display window 51 where the input character is displayed is disposed. The cross-shaped figure $50a_1$ corresponds to the cross key 31 of the input part 21. As can be seen from "L" displayed on the upper part, the character type selection area 50b corresponds to an L button 34. Likewise, the operation function display areas 50c, 50d, and 50e correspond to an R button 35, an X button 32d, and a Y button 32c, respectively. As such, since the arrangement of the individual areas of the character input window 50 corresponds to the arrangement of the operation buttons of the input part 21 illustrated in FIG. 2, the user can perform the character input while viewing the display screen 24, without difficulty in operating the input part 21.

In the character selection area 50a, the cross-shaped figure $50a_1$ that imitates the cross key 31 is displayed. In the cross-shaped figure $50a_1$, a character of "NA" is displayed at the upper side of the cross, a character of "HA" is displayed at the right side of the cross, a character of "MA" is displayed at the lower side of the cross, and a character of "YA" is displayed at the left side of the cross. This display corresponds to a function of when the cross key 31 of the input part 21 is operated. If the upward direction of the cross key is pressed, characters of "NA" series can be input, if the rightward direction is pressed, characters of "HA" series can be input, if the downward direction is pressed, characters of "MA" series can be input, and if the leftward direction is pressed, characters of "YA" series can be input.

In the character selection area 50a of FIG. 6A, at the upper side of the cross of the cross-shaped figure $50a_1$, a circle $50a_2$ is added to the character of "NA" and, it indicates that the user presses the upward direction of the input part 21 and the characters of "NA" series are selected. In this case, the character of "NA" to be selected is displayed bigger than the characters of "HA", "MA", and "YA" indicating other series (other first character groups) not to be selected. According to this operation, the character of "NA" is displayed on the input character display window 51. Among the characters that are displayed on the input character display window 51, in the characters that are not finally determined to be input and are temporarily determined, an underline is displayed. The underline is displayed on the character of "NA" and the character of "NA" is a character that is not finally determined.

A Δ mark 50a₃ is added to the upper part of the circle 50a₂ added to the character of "NA" and a ∇ mark 50a₄ is added to the lower part of the circle, and the character can be selected by pressing one of the upward direction and the downward direction of the cross key 31, When the characters of "NA" series are selected, the selection priorities of the characters become order of "NA", "NI", "NU", "NE", and "NO" and the characters having the lower selection priorities are sequentially selected by pressing the upward direction of the cross key 31. For example, when the circle 50a₂ is added to the character of "NA", if the upward direction of the cross key 31 is pressed, the character of "NI" is selected. In this case, as illustrated in FIG. 6B, the character of "NI" is displayed, instead of the character of "NA". When the character of "NU" is selected, instead of the character of "NI", the upward direction needs to be pressed. When the character of "NO" having the lowest selection priority is selected, if the cross key 31 is pressed, the characters of "NA" series make a round and the character of "NA" having the highest selection priority is selected.

When the input of the characters of "NA" series ends and a next character is selected, pressing of an operation button (for example, A button 32a) to determine the character or pressing of the leftward and rightward directions other than the upward and downward directions of the cross key 31 is performed.

Meanwhile, as illustrated in FIG. 6B, when the circle 50a₂ is added to the character of "NI", if the downward direction of the cross key 31 is pressed, "NA" that has the selection priority higher than the selection priority of "NI" is selected and "NA" is displayed on the upper side of the cross-shaped figure 50a₁. That is, in the case of "NA" series that can be selected by pressing the upward direction of the cross key 31, the character having the low selection priority is selected by pressing the upward direction. However, the character having the high selection priority is selected by pressing the downward direction of the reverse direction. Therefore, when the cross key 31 is erroneously excessively pressed, the same direction does not need to be continuously input until a desired character is selected again and the character can be input without giving an excessive load to the user. When the character is selected by pressing the rightward direction of the cross key 31, the characters are selected in order of the selection priorities by pressing the rightward direction and the characters are selected in inverse order of the selection priorities by pressing the leftward direction to be a reverse direction. That is, if the same direction as the direction pressed to select the second character group is pressed, the characters are selected in the order of the selection priorities and if the reverse direction is pressed, the characters are selected in the inverse order of the selection priorities.

In the character type selection area 50b, the circle 50b₁ is added to the character "A" to indicate that hiragana is an input object at the present time. The character type can be selected by pressing the L button 34 and can be sequentially switched into katakana, English character, numeral/sign, or face font. If the character type is switched into katakana, the circle 50b₁ is moved to the character "A". If the character type is switched into the English character, the circle 50b₁ is moved to the character "A". If the character type is switched into the numeral/sign, the circle 50b₁ is moved to the character "1@". If the character type is switched into the face font, the circle 50b₁ is moved to the character of the face font.

In the operation function display area 50c, a function of when the R button 35 is operated is displayed. By operating the R button 35, a sonant mark or semi-sonant mark may be added to the selected character, or the selected character may be converted into a small letter or a half-width character. However, the sonant mark or the semi-sonant may not be added or the character may not be converted into the small character or the half-width character depending on the selected character. For this reason, when the R button 35 is pressed according to the selected character, whether the sonant mark or the semi-sonant mark can be added, or when the character can be converted into the small letter or the half-width character is previously determined. A circle is added to """" when the sonant mark can be added, is added to "°"" when the semi-sonant mark can be added, is added to "small" when the character can be converted into the small character, and is added to "full-width" when the character can be converted into the half-width character. For example, when "HA" of hiragana is selected, the circle is added to """" and "°"".

In the operation function display area 50d, a function of when the X button 32d is operated is displayed. In the operation function display area 50d, "series switching" is displayed. If the user presses the X button 32d, the "series switching", that is, the first character group can be selected. In the character selection area 50a of FIG. 6A, the characters of "NA", "HA", "MA", and "YA" that indicate "NA" series to "YA" series are displayed around the cross-shaped figure 50a₁. However, by performing "series" switching, the characters of "RA" and "WA" are displayed and the characters of "RA" series to "WA" series can be input.

In the operation function display area 50e, a function of when the Y button 32c is operated is displayed. In the operation function display area 50e, "converting" is displayed. If the user presses the Y button 32c, the character (which the underline of the input character display window 51 is added to) that is not finally determined among the input characters can be converted. For example, when the characters of hiragana are input, the characters can be converted into Chinese characters. If the user presses the Y button 32c, characters of conversion candidates are displayed on the input character display window 51. If the desired characters are displayed by pressing the Y button 32c plural times, the user presses the operation button (for example, A button 32a) to finally determine the characters and the characters are fixed.

At the lower side of the input character display window 51, a transmission range display area 52 is provided. Since the transmission range display area 52 displays a range to transmit an input sentence, a transmission range can be switched according to the selection from the user. In FIGS. 6A and 6B, in the transmission range display area 52, "around" is displayed, and the input sentence is transmitted to the character around the player character who performs chatting.

Figure 7:
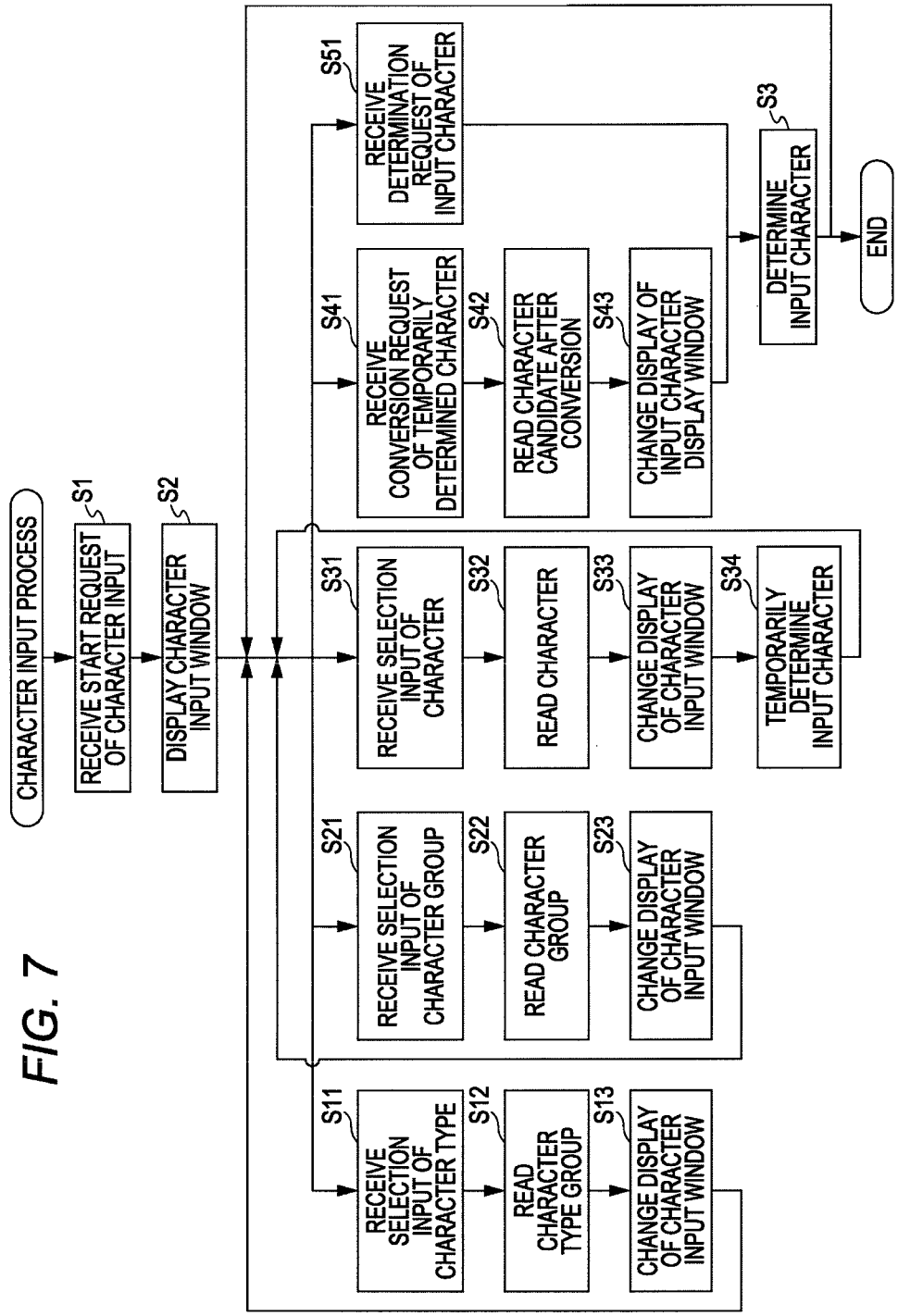
FIG. 7 is a flowchart illustrating a character input process in the character input device according to the embodiment of the present invention.
Figure 8:
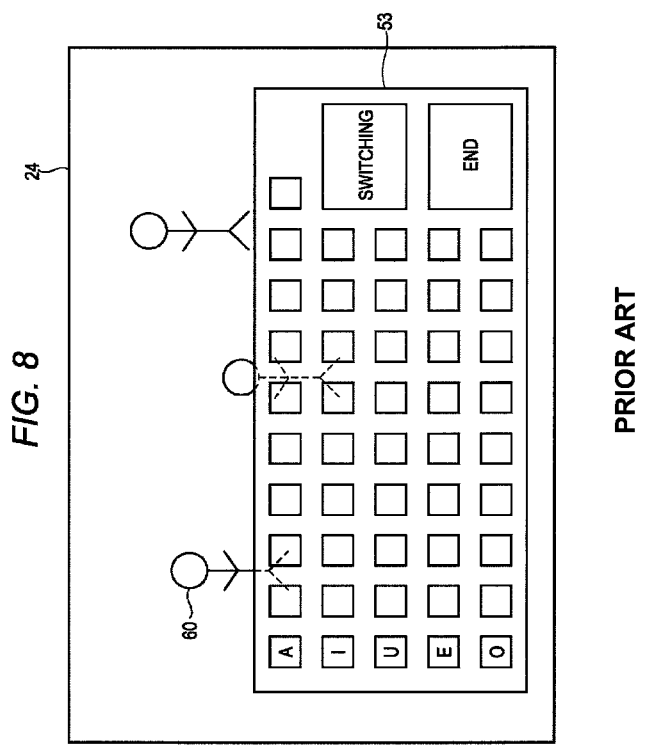
FIG. 8 is a diagram illustrating an example of a display screen where a software keyboard is displayed, when chatting is performed in an online game.

Next, a character input process according to the embodiment of the invention will be described. FIG. 7 is a flowchart illustrating an example of the character input process. First, if the user operates the input part 21 and requests to start to input the characters (step S1), the character input window 50 is displayed (step S2). The user can perform switching of the character type, switching of the first character group in the selected character type, and selecting of the character.

If the user operates the input part 21 and performs an operation to select the character type, an input operation signal is received by the control part 11 (step S11). If the input of the selection operation of the character type is received, the character type group after the switching is read from the character input table 40 set to the RAM 12 (step S12) and display of the character input window 50 is changed according to the read character type group (step S13). For example, when the character type is changed from hiragana to katakana by the operation of the input part 21, hiragana that is displayed at the upper, lower, left, and right sides of the cross-shaped figure $50a_1$ of the character selection area $50a$ is changed to katakana.

If the user operates the input part 21 and performs an operation to select the first character group from the same character type, an input operation signal is received by the control part 11 (step S21). If the input of the selection operation of the character group is received, the first character group after the switching is read from the character input table 40 set to the RAM 12 (step S22) and display of the character input window 50 is changed according to the read character group (step S23). For example, when the characters of "A", "KA", "SA", and "TA" are displayed at the upper, lower, left, and right sides of the cross-shaped figure $50a_1$ of the character selection area $50a$, if the switching of the character group is performed by the operation of the input part 21, the characters that are displayed at the upper, lower, left, and right sides of the cross-shaped figure $50a_1$ are switched into the characters of "NA", "HA", "MA", and "YA". By the switching, the characters of "NA" series to "YA" series can be selected.

If the user operates the input part 21 and performs an operation to select the characters, an input operation signal is received by the control part 11 (step S31). If the input of the character selection operation is received, the character that has the selection priority lower than the selection priority of the selected character by 1 or the character that has the selection priority higher than the selection priority thereof by 1 is read from the character input table 40 set to the RAM 12 (step S32) and the display of the character input window 50 is changed according to the read character data (step S33). For example, when the character of "NA" is displayed in the upward direction of the cross-shaped figure $50a_1$, if the upward direction of the cross key 31 of the input part 21 is pressed, the character of "NA" is selected and the circle $50a_2$ is added to the character of "NA". If a request for temporarily determining the selected character (for example, pressing of the A button 32a) is received by operating the input part 21 by the user, the input character is temporarily determined (step S34). When the cross key 31 of the input part 21 is pressed plural times, the processes of steps S31 to S33 are repeated without performing the temporary determination of the input character of step S34, and the display of the character of any one of the upper, lower, left, and right sides of the cross-shaped figure $50a_1$ is switched whenever the cross key 31 is pressed.

If the user operates the input part 21 and performs an operation to request to convert the temporarily determined character (pressing of the Y button 32c), an input operation signal is received by the control part 11 (step S41). If the input of the conversion request of the character is received, the character candidates after the conversion are read on the basis of the conversion character table (step S42). In the conversion character table, "reading" of Kana characters and characters (mainly, Chinese characters or English characters; hereinafter, referred to as Chinese characters) after the conversion having the same sound as the "reading" are associated and stored. The plural Chinese characters that have the same sound as the "reading" of the Kana characters may exist and the priorities are previously set in order of the characters considered as the characters having the high use frequency. If the input of the conversion request of the characters is received, the display is changed in the input character display window 51, and the temporarily determined characters are replaced by the Chinese characters having the highest priority and are displayed (step S43). If the user performs the operation input (for example, pressing of the A button 32a) to finally determine the character as the input character, the replaced Chinese characters are finally determined as the input characters (step S3). When the user executes the conversion request plural times, the processes of steps S41 to S43 are repeated without determining the input characters of step S3, and the display of the Chinese characters that are displayed on the input character display window 51 in order of the high priorities are switched, whenever the Y button 32c is pressed. When the desired Chinese characters are displayed on the input character display window 51, the user performs the operation input to finally determine the characters as the input characters.

When the processes of steps S41 to S43 are not executed, that is, hiragana is not converted into the Chinese characters, the user can determine the temporarily determined characters as the input characters. In this case, if the user performs the operation input (for example, pressing of the A button 32a) to finally determine the characters as the input characters, an input operation signal is received by the control part 11 (step S51). If the operation signal is received, the temporarily determined characters are determined as the input characters (step S3).

After the processes of steps S11 to S13, steps S21 to S23, steps S31 to S34, steps S41 to S43, step S51, and step S3 are executed, the user can repetitively execute these processes to additionally input the sentence. After the characters are determined as the input characters by step S3, when it is determined that the sentence does not need to be added, the user performs the sentence fixation operation and the sentence that is displayed on the input sentence display window 51 is specified as contents of a conversation of the user. The specified speech is transmitted with respect to the range displayed in the transmission range display area 52.

Next, an English character input process according to the embodiment of the invention will be described in accordance with FIG. 7. First, if the user operates the input part 21 and requests to start to input the characters (step S1), the character input window 50 is displayed (step S2). The user can perform switching of the character type, switching of the first character group in the selected character type, and selecting of the character.

If the user operates the input part 21 and performs an operation to select the character type, an input operation signal is received by the control part 11 (step S11). If the input of the selection operation of the character type is received, the character type group after the switching is read from the character input table 40 set to the RAM 12 (step S12) and display of the character input window 50 is changed according to the read character type group (step S13). When the character type is changed from hiragana to English character by the operation of the input part 21, hiragana that is displayed at the upper, lower, left, and right sides of the cross-shaped figure $50a_1$ of the character selection area $50a$ is changed to English character.

If the user operates the input part 21 and performs an operation to select the first character group from the same character type, an input operation signal is received by the control part 11 (step S21). If the input of the selection operation of the character group is received, the first character group after the switching is read from the character input table 40 set to the RAM 12 (step S22) and display of the character input window 50 is changed according to the read character group (step S23). For example, when the characters of "A", "D", "G", and "J" are displayed at the upper, lower, left, and right sides of the cross-shaped figure $50a_1$ of the character selection area $50a$, if the switching of the character group is performed by the operation of the input part 21, the characters that are displayed at the upper, lower, left, and right sides of the cross-shaped figure 50a₁ are switched into the characters of "M", "P", "T", and "W". By the switching, "M" to "Z" can be selected.

If the user operates the input part 21 and performs an operation to select the characters, an input operation signal is received by the control part 11 (step S31). If the input of the character selection operation is received, the character that has the selection priority lower than the selection priority of the selected character by 1 or the character that has the selection priority higher than the selection priority thereof by 1 is read from the character input table 40 set to the RAM 12 (step S32) and the display of the character input window 50 is changed according to the read character data (step S33). For example, when the character of "M" is displayed in the upward direction of the cross-shaped figure 50a₁, if the upward direction of the cross key 31 of the input part 21 is pressed, the character of "M" is selected and the circle 50a₂ is added to the character of "M". If a request for temporarily determining the selected character (for example, pressing of the A button 32a) is received by operating the input part 21 by the user, the input character is temporarily determined (step S34). When the cross key 31 of the input part 21 is pressed plural times, the processes of steps S31 to S33 are repeated without performing the temporary determination of the input character of step S34, and the display of the character of any one of the upper, lower, left, and right sides of the cross-shaped figure 50a₁ is switched whenever the cross key 31 is pressed.

In this case, the processes of steps S41 to S43 are not executed, because English character is not converted into the Chinese characters. If the user performs the operation input (for example, pressing of the A button 32a) to finally determine the characters as the input characters, an input operation signal is received by the control part 11 (step S51). If the operation signal is received, the temporarily determined characters are determined as the input characters (step S3).

After the processes of steps S11 to S13, steps S21 to S23, steps S31 to S34, step S51, and step S3 are executed, the user can repetitively execute these processes to additionally input the sentence. In the English character input process, step S35 and step S51 may be skipped, because English character is not converted into the Chinese characters. After the characters are determined as the input characters by step S3, when it is determined that the sentence does not need to be added, the user performs the sentence fixation operation and the sentence that is displayed on the input sentence display window 51 is specified as contents of a conversation of the user. The specified speech is transmitted with respect to the range displayed in the transmission range display area 52.

In the embodiment, each display area of the character input window 50 is displayed to correspond to the arrangement of the operation buttons of the input part 21. For example, the device that is used as the input part 21 is recognized by the control part 11 and the arrangement of the display areas of the character input window 50 can be changed to correspond to the arrangement of the operation buttons of the device, according to the type of the recognized device.

In the embodiment, the case where the character input device according to the invention is mainly used as the game apparatus is described. However, the character input device according to the present invention can be applied to the case where a character is input by a mobile phone or a personal computer, the case where a character is input by various operation terminals in a bank, a convenience store or other institutions, and so on.

EXPLANATIONS OF REFERENCE NUMERALS

1 APPARATUS BODY
11 CONTROL PART
12 RAM
13 HDD
14 SOUND PROCESSING PART
15 GRAPHIC PROCESSING PART
16 DVD/CD-ROM DRIVE
17 COMMUNICATION INTERFACE
18 INTERFACE PART
19 FRAME MEMORY
20 MEMORY CARD SLOT
21 INPUT PART (CONTROLLER)
22 SOUND OUTPUT DEVICE
23 DISPLAY DEVICE
24 DISPLAY SCREEN
25 STORAGE MEDIUM
26 ANTENNA
27 CMMUNICATION NETWORK
28 MEMORY CARD
30 INPUT PART BODY
31 CROSS KEY
32 BUTTON GROUP
33 JOYSTICK
34 L BUTTON
35 R BUTTON
36 SELECT BUTTON
37 START BUTTON

What is claimed is:

1. A character input device that comprises a display and an inputer and inputs a character according to an operation of the inputer by a user, wherein
the inputer comprises at least one operation inputer that causes the character input device to execute a predetermined function according to an input from the user,
the input characters belong to any one of a plurality of second character groups,
each first character group comprises the plurality of second character groups,
the character input device comprises:
a first character group information displayer that displays first character group information about the first character group, in the display;
a character selector that selects the input character from the second character group, according to the operation of the inputer by the user; and
an input character determiner that determines the character selected by the character selector as the input character, according to the operation of the inputer by the user; and
an input displayer that displays information about the function of the operation inputer in the display that corresponds to an arrangement of the operation inputer in the inputer,
the first character group information displayer displays a part of the input characters, of the characters belonging to each of the plurality of second character groups, and
a display screen of the display displays a character input window that displays information regarding a character input by the first character group information displayer, and an area that displays a game implementation situation,
wherein the inputer comprises a direction inputer configured to input a direction,
the character selector specifies the second character group to which the input characters belong, on the basis of the direction input to the direction inputer, and selects the characters belonging to the specified second character group,
priorities are set to the characters belonging to an individual second character group, the character selector selects the input characters from the characters belonging to the second character group, according to the priorities, when the same direction as the direction which is initially input to the direction inputer to specify the second character group to which the input characters belong is input to the direction inputer, and the character selector selects the input characters from the characters belonging to the second character group, according to an inverse of the priorities, when a reverse direction, which is opposite to the direction which is initially input to the direction inputer to specify the second character group to which the input characters belong, is input to the direction inputer.

2. The character input device according to claim 1,
wherein the input characters belong to any one of a plurality of character type groups,
each character type group comprises the plurality of first character groups,
the character input device comprises a character type group selector that selects the character type group to which the input characters belong, according to the operation of the inputer by the user.

3. The character input device according to claim 1, wherein
the character selector selects the input characters from the characters belonging to the plurality of second character groups, according to the priorities, and
the first character group information displayer displays the characters selected by the character selector, of the characters belonging to the plurality of second character groups.

4. A tangible computer readable medium that stores a character input program that executes a character input in a computer device which comprises a display and an inputer, according to an operation of the inputer by a user, wherein
the inputer comprises at least one operation inputer that causes the character input device to execute a predetermined function according to an input from the user,
the input characters belong to any one of a plurality of second character groups,
each first character group comprises the plurality of second character groups, the character input program causes the computer to function as:

a first character group information displayer that displays first character group information about the first character group, in the display;
a character selector that selects the input characters from the second character group, according to the operation of the inputer by the user;
an input character determiner that determines the characters selected by the character selector as the input characters, according to the operation of the inputer by the user; and
an input displayer that displays information about the function of the operation inputer in the display that corresponds to an arrangement of the operation inputer in the inputer,
the first character group information displayer displays a part of the input characters, of the characters belonging to each of a plurality of second character groups, and
a display screen of the display displays a character input window that displays information regarding a character input by the first character group information displayer, and an area that displays a game implementation situation,
wherein the inputer comprises a direction inputer configured to input a direction, and
the character selector specifies the second character group to which the input characters belong, on the basis of the direction input to the direction inputer, and selects the characters belonging to the specified second character group,
priorities are set to the characters belonging to an individual second character group,
the character selector selects the input characters from the characters belonging to the second character group, according to the priorities, when the same direction as the direction which is initially input to the direction inputer to specify the second character group to which the input characters belong is input to the direction inputer, and
the character selector selects the input characters from the characters belonging to the second character group, according to an inverse of the priorities, when a reverse direction, which is opposite to the direction which is initially input to the direction inputer to specify the second character group to which the input characters belong, is input to the direction inputer.

* * * * *